United States Patent [19]
Stansell

[11] 3,710,540
[45] Jan. 16, 1973

[54] SELF-PURGING DISK SYSTEM HAVING AIR FLOW GUIDE MEANS

[75] Inventor: Alpheus F. Stansell, Thousand Oaks, Calif.

[73] Assignee: Burroughs Corporation, Detroit, Mich.

[22] Filed: Nov. 25, 1970

[21] Appl. No.: 92,649

[52] U.S. Cl. ..............................55/473, 340/174.1 E
[51] Int. Cl. ..............................B01d 46/00
[58] Field of Search ..................55/473; 340/174.1 E; 179/100.2 P

[56] References Cited

UNITED STATES PATENTS

| | | | |
|---|---|---|---|
| 3,631,423 | 12/1971 | Groom | 340/174.1 E |
| 3,172,962 | 3/1965 | Lammeren et al. | 179/100.2 P |
| 3,381,285 | 4/1968 | Wallen | 179/100.2 P |
| 3,155,977 | 11/1964 | Marrs | 340/174.1 E |
| 2,899,260 | 8/1959 | Farrand et al. | 340/174.1 E |

*Primary Examiner*—Tim R. Miles
*Attorney*—Christie, Parker & Hale

[57] ABSTRACT

A rotating magnetic disk is enclosed in a housing having at least one pair of ports. An external conduit having a filter therein interconnects the ports. The rotation of the disk imparts a velocity to the air adjacent to the disk faces and the interior of the housing provides an airflow guide which causes air from both sides of the disk to flow into a scoop disposed in one port and coupled to the conduit. Thus a high rate of air circulation through the conduit is achieved and the air is rapidly filtered.

8 Claims, 5 Drawing Figures

INVENTOR.
ALPHEUS F. STANSELL

BY

Christie, Parker & Hale
ATTORNEYS

SELF-PURGING DISK SYSTEM HAVING AIR FLOW GUIDE MEANS

BACKGROUND OF THE INVENTION

1. Field of the Invention

This invention relates to self-purging systems which remove foreign particles from a closed system housing a rotating mass and, more particularly to an improved configuration for efficiently removing such particles from both sides of a rotating magnetic disk.

2. Description of the Prior Art

In many mechanical systems a need has arisen for eliminating foreign matter from the interior of the enclosure of the system. It is particularly important in magnetic disk file memory systems to assure that the ambient air be free of contaminants. In magnetic disk file systems information is stored on the magnetic surface of a large disk which is rotatable in a housing. The information is written onto and read from tracks on the face of the disk by means of magnetic transducers. These transducers or heads are positioned extremely close to the disk face in order to assure efficient magnetic coupling between the magnetic surface and the transducers. In one example, the transducers are only 60 microinches from the disk face. Because of this extremely narrow spacing it is possible for very small particles to work their way in between the transducers and the disk face and disrupt the operation of the system.

In an attempt to prevent contaminating particles from disrupting system operation the disk file system is assembled in a clean room specially designed and tightly controlled to limit the foreign matter in the air therein. Nonetheless, contaminants are still present in the room and these contaminants find their way into the system housing. Additionally, contaminants may be generated during the operation of the system.

Application Ser. No. 832,930, now U.S. Pat. No. 3,631,423, entitled SELF-PURGING DISK SYSTEM filed June 13, 1969 in the name of Robert C. Groom and assigned to the assignee of this invention discloses a system for removing particles from a disk file system after the housing has been closed. One embodiment of the self-purging system described therein includes an enclosure defining a pair of circular end walls and a cylindrical side wall for housing the rotating magnetic disk. One end wall has a pair of spaced apart ports one of which is located close to the periphery of the disk and the other of which is located close to the center or axis of rotation. A conduit having a filter therein couples the two parts together.

In operation, the rotating disk acts like a pump with a constant flow of air coming off the periphery of the disk and a static high pressure develops in the air near the disk's outer diameter and a static low pressure area is developed near the center. This developed static pressure differential in the air causes air to circulate through the conduit and particles are removed by the filter. A problem arises in this system because the filter acts like a resistance in the conduit and impedes the amount of airflow. The filter acts like a resistance in that a static pressure differential must be dropped across the filter in order to achieve a particular value of airflow. Thus the rate of flow of air measured in cubic feet per minute is somewhat limited. Furthermore, the amount of the static pressure differential is a function of the speed of rotation of the disk. For high speed units which have rotation rates of approximately 1,700 rpm a sufficient static pressure differential is established for satisfactory airflow rates. However for slower speed units which have rotation rates of about 500 rpm there is substantially less airflow. Another problem arises in connection with the removal of particles from the air adjacent to the side of the disk opposite to the end wall having the ports. Although this self-purging system removes particles from the air adjacent one side of the disk fairly rapidly it has been found that particles in the air adjacent the other side of the disk take a relatively long time to find their way into the filter. It has also been found that particles of foreign matter, in addition to those that may have been present in the housing at the time of assembly, may be generated during the operation of the magnetic disk file system by possible chemical reactions, or possibly by erosion of some type. Thus it is not possible to completely self-purge the system and wait until all particles have been removed before actually putting the disk file memory to its intended use. Instead it is important to have means for rapidly removing the particles from both sides of the rotating disk on a continuing basis.

One modification of this system which would remove particles from both sides would be to provide a two-conduit system. Such a two-conduit system would have two pairs of ports and two connecting conduits, for each side of the disk. This solution, of course, increases the cost of the system in that more parts and more machining are required. Another partial solution would be to have one port in one end wall, the other port in the other wall, and have the conduit fold over the edge of the enclosure. This approach suffers from the disadvantage that the conduit extending beyond the periphery of the enclosure makes the overall system profile unwieldy and difficult to handle. Furthermore this approach does not increase the rate of airflow through the conduit but merely redistributes the relative amounts of air taken from the two sides of the disk.

SUMMARY OF THE INVENTION

This invention is directed to an improved self-purging system which has a scoop connected to the conduit and disposed in a port of the enclosure and which has airflow guiding means to channel the flow of air caused by the rotation of the mass into the scoop and thereby increase the achievable rate of circulating air through the conduit so that foreign matter can be rapidly removed from the interior of the enclosure. The invention takes advantage of the fact that the air adjacent to the moving mass has a velocity component and thus provides increased rates of air circulation than can be achieved through the prior art technique of relying on an internally developed static pressure differential. With the increased rates of air circulation, effective self-purging can be achieved in systems having a slow speed rotating mass.

In a preferred embodiment the airflow guiding means guides air flowing on one side of a rotating disk so that it folds over the rim of the disk, joins the air flowing on the other side and enters a scoop disposed in an aperture in an end wall of the disk enclosure. Thus the preferred embodiment provides for rapid removal of particles from both sides of the disk without creating the new problems which would result from either a two-conduit system or a folded-over conduit system.

In its preferred form, the airflow guiding means comprises a ramp in an end wall of the enclosure. The ramp projects inwardly toward the disk face along a circumferential direction. The ramp and the disk face define a path which narrows in the direction of the stream lines of the flow of air being pumped by the disk. This narrowing path provides a restriction to circumferential airflow and therefore a substantial airflow in a radial direction outward from the center of the disk is achieved. With the airflow thus radially directed it can fold over the edge of the disk and join the flow of air adjacent the opposite face. The airflow guiding means further comprises a projection in the side wall of the enclosure adjacent to the ramp which projection defines in cooperation with the disk edge a narrowing throat for guiding the air flowing adjacent the disk edge so that it flows in a generally inwardly radial direction toward the scoop. In order to further increase the rate of airflow the end wall connected to the scoop is provided with a ramp on its interior surface. This ramp projects upwardly away from the disk face along a circumferential direction. Thus, this ramp cooperates with the disk face to define an airflow channel which opens in the direction of the stream lines.

DETAILED DESCRIPTION OF THE PREFERRED EMBODIMENT

Figure 1:
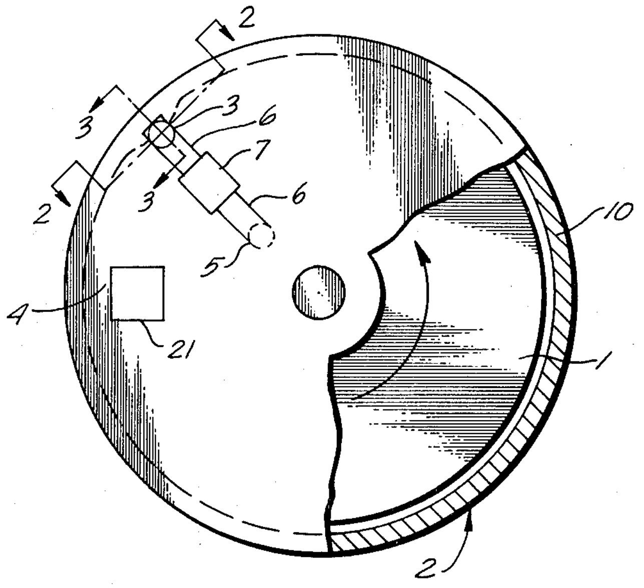
FIG. 1 is a front elevation view of a rotatable disk file assembly having a self-purging system, the view has been partially broken away to show the rotating disk.

FIG. 1 shows a disk 1 within a housing 2 comprising end walls 4 and 8. Preferably, each end wall is cast metal and has a substantially flat circular central part and a flange at the rim. A plurality of bolts (not shown) through the flanges hold the two end walls together so that a cylindrical side wall 10 is formed. Disk 1 is rotatable by means not shown and is used for the storage of information on its magnetic surfaces.

A plurality of magnetic transducers are representively shown by block 21. These magnetic transducers are used for reading and writing information in a conventional manner. In the preferred embodiment both faces of disk 1 are used for storing information and therefore magnetic transducers are also provided for the face of disk 1 which is opposite to the face shown in FIG. 1.

The magnetic transducers are attached to end walls of housing 2 and are positioned so that there is a gap of only 60 microinches from the faces of disk 1. Thus it is possible for extremely small particles to enter the gap between the magnetic transducers and the disk face. If this is allowed to happen there can be a serious degradation in the electrical performance of the system. In an effort to remove as many particles from the closed system as possible the system is assembled in a clean room. However it has not been possible to remove all particles in this manner. Furthermore, it has been found that contaminating particles are generated during operation of the magnetic disk file system by possible chemical reactions, or possibly erosion of some type.

A port 3 is provided in end wall 4 of the housing 2 adjacent to the outer periphery of disk 1. Another port 5 is provided in the same end wall 4 near the center of axis of rotation of disk 1. The two ports 3 and 5 are connected externally through a conduit 6 in which a filter 7 is located. The filter 7 is an absolute filter and collects all particles over a selected size. Preferably the filter 7 collects all particles over 20 microinches or approximately one-half micron in size.

In operation, disk 1 rotates thereby causing the air adjacent to the disk faces to flow in a generally laminar fashion. The air flowing near the periphery of the disk is guided by airflow guiding means which will be described hereinafter so that the air flows out of port 3 through external conduit 6 and returns to the enclosure 2 through port 5.

Figure 2:
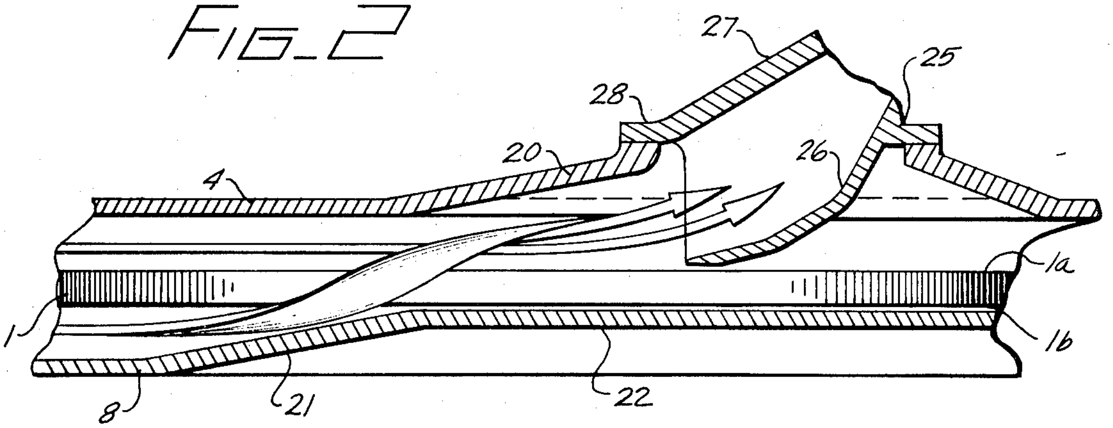
FIG. 2 is a cross-sectional view of the assembly of FIG. 1, taken along section line 2—2 therein; this view illustrates the flow pattern of air adjacent to the disk.
Figure 3:
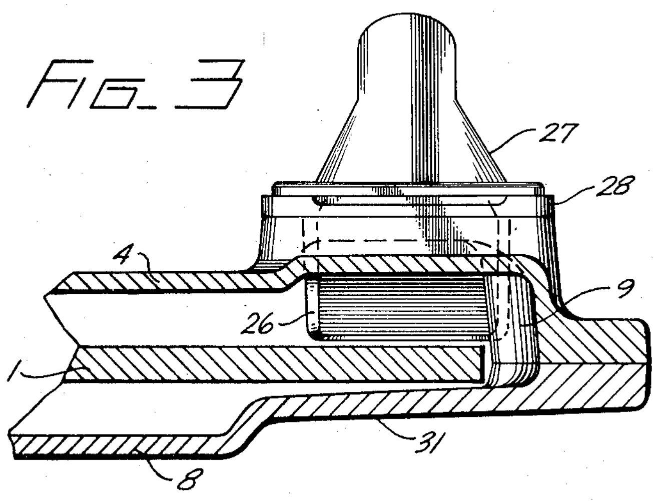
FIG. 3 is a cross-sectional view of the assembly of FIG. 1, taken along section line 3—3 therein.

Refer now to FIGS. 2 and 3. Disk 1 rotates about an axis parallel to the plane of these views and causes a laminar flow of air in a left to right direction as seen from the view of FIG. 2. At the left of FIG. 2 end walls 4 and 8 are parallel to and equally spaced apart from opposite faces 1*a* and 1*b* of disk 1.

End wall 8 has a bridge shaped contour in the area shown in FIG. 2. This contour comprises ramp 21 which projects inwardly toward disk face 1*b* along a circumferential direction. Ramp 21 terminates in shelf 22 which is parallel to disk face 1*b* along a circumferential direction and is closely spaced thereto. Ramp 21 and disk 1 thereby define an airflow path which narrows in the direction of stream lines of the flow of air being pumped by rotating disk 1. This narrowing path provides a restriction to the circumferential flow of air. Consequently, a large percentage of the air in this area flows in a radial direction outwardly from the center of rotation.

With the airflow thus radially directed it is possible to guide the air so that it will fold or curl over the edge of the disk and join the flow of air adjacent to the opposite disk face 1*a*. The side wall 10 of housing 2 defined by the mating flanges of end walls 4 and 8 provides the means for restricting the airflow from continuing in an outward radial direction and causes the air to curl over the disk.

The rate of airflow which folds over the disk is enhanced by the provision of a ramp 20 in end wall 4. Ramp 20 projects upwardly away from disk face 1*a* along a circumferential direction. Thus this ramp cooperates with the disk to define an airflow channel which opens in the direction of the stream lines. This enhancement of the rate of airflow is attributable to a difference in air pressure between the air flowing subject to restriction of a narrowing path and the unrestricted air flowing adjacent face 1*a*.

The side wall of housing 2 also provides means for guiding the air in an inwardly radial direction. As shown by the dotted lines in FIG. 1 and illustrated in FIG. 3 the flanges at the rims of end walls 4 and 8 have a tongue 9 projecting inwardly toward the disk edge. Tongue 9 defines in cooperation with the disk edge a narrowing throat for guiding the air flowing adjacent the disk edge so that it flows in a generally inwardly radial direction.

As best shown in FIG. 3 end wall 8 also has a ramp 31 projecting inwardly toward disk face 1*b* along a radial direction. Thus there is more clearance between the disk face 1*b* and end wall 8 in the central portion of the assembly than at the edge. This offers an advantage in that any contact between the disk and end wall 8 which may occur during assembly will occur at the edge. Since there are no magnetic tracks for storing information at the edge of the disk any contacts at this point will not impair the usefulness of the disk.

FIG. 2 also shows that a scoop 25 is disposed in port 3. Scoop 25 collects the laminar flow of air pumped by the disk and guides it into conduit 6 where it is filtered and then returned to housing 2 through port 5.

Scoop 25 provides a means for taking advantage of the fact that the rotation of disk 1 imparts a velocity to the air adjacent the disk and thereby enables high flow rates through the external conduit 6.

Figure 4A:
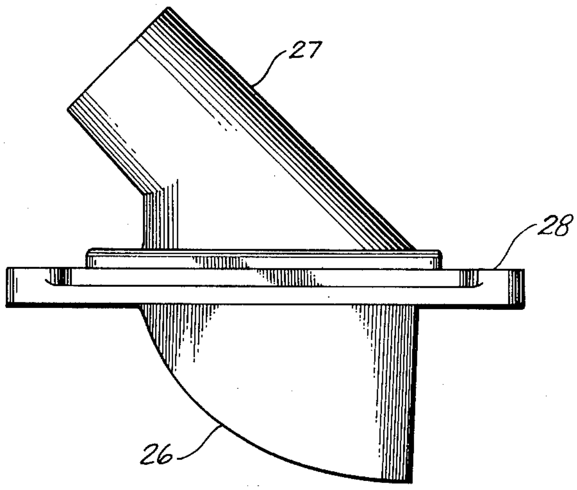
FIG. 4 comprises FIGS. 4A and 4B which are elevation views of a scoop used to guide the flow of air into the conduit shown in FIG. 1.
Figure 4B:
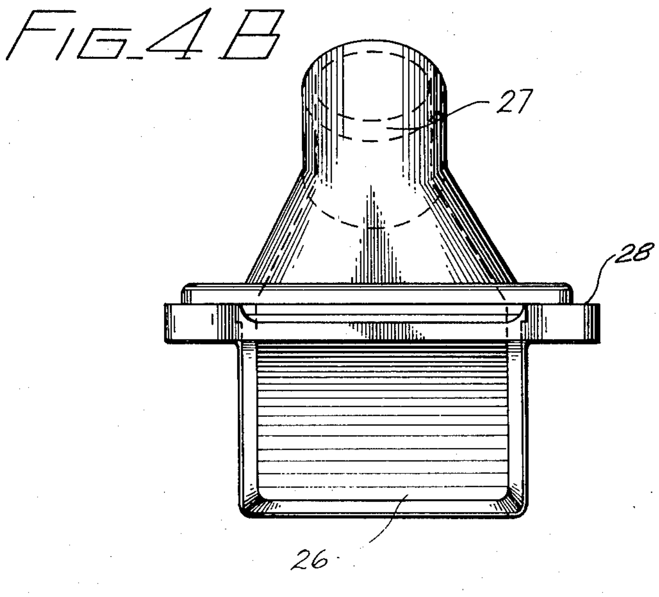

Scoop 25 is shown in more detail in FIGS. 4A and 4B. Preferably scoop 25 is molded from polycarbonate, glass fiber and comprises dish 26 and throat 27. The lower portion of the dish 26 provides a peeling edge for peeling off, as best shown in FIG. 2, a portion of the boundary layer of flowing fluid. Flange 28 is provided for easy mounting of the scoop onto housing 2 by a plurality of screws (not shown).

In an actual embodiment of this invention, disk 1 rotates at 500 rpm. The diameter of the disk is approximately 30 inches. The interior of side wall 10 is spaced approximately one-half inch from the edge of the disk except in the area of tongue 9 where spacing narrows to 0.09 inch. The interiors of end walls 4 and 8 are spaced approximately one-half inch from the disk faces 1*a* and 1*b*. The bridge shaped contour comprising ramp 21 and shelf 22 narrows the spacing to 0.09 inch between disk face 1*b* and end wall 8. The ramp 20 in end wall 4 opens the spacing to approximately 1 inch at the point where flange 28 of scoop 25 is mounted.

It should be noted that various modifications can be made to the preferred embodiment of this invention. For example, the scoop 25 can be disposed in a port in side wall 10 to guide the dynamic flow of air into the external conduit 6. With the scoop 25 so located it is preferable to provide a bridge shaped contour such as ramp 21 and shelf 22 on the interior of both end walls 4 and 8, thereby providing airflow guide means which cause a large percentage of the air adjacent to the disk to flow outwardly into the scoop 25. As other examples of modifications, the housing end walls can be of various shapes. The circular shape is preferred because it conforms to the shape of the disk. Furthermore, the end walls need not be cast metal, the casting merely simplifies the task of providing the appropriate interior contour used in the practice of this invention.

I claim:

1. A system for filtering air surrounding a rotating disk comprising a housing for enclosing the disk, the housing having first and second ports, the first port being located in an end wall portion spaced away from a first face of the disk near its periphery, a scoop disposed in the first port for guiding air pumped by the rotation of the disk out of the housing, air flow guide means for folding air flowing adjacent to the second face over the edge of the disk into the scoop, a conduit connecting the scoop to the second port, and a filter within the conduit for collecting particles from air flowing through the conduit.

2. The system according to claim 1 wherein the first and second ports are located in the same end wall portion of the housing and the second port is near the center of rotation of the disk whereby differences in static pressure between the air adjacent the periphery and near center increase the airflow through the connecting conduit.

3. The system according to claim 1 wherein the airflow guide means comprises a ramp on the interior surface of the housing adjacent to the second face and projecting inwardly toward the disk face along a circumferential direction, the ramp and the disk face defining a path which narrows in the direction of airflow thereby restricting circumferential airflow and producing a substantial airflow in a radial direction outward from the center of the disk.

4. In a rotating magnetic disk file self-purging system having a housing for the disk, a conduit connected between two ports in the housing and a filter in the conduit for filtering circulating air flowing because of the pumping action of the rotating disk; apparatus for causing air flowing on one side of the disk to fold over the disk edge and join air flowing on the other side where it can enter the conduit comprising a first ramp on the interior surface of the housing projecting inwardly toward a first face of the disk along a circumferential direction, the first ramp and the first face defining a narrowing path therebetween for the airflow thereby restricting circumferential airflow and causing a substantial spin-off of air in a radial direction outward from the center of the disk, a tongue on the interior surface of the housing projecting inwardly toward the edge of the disk in the area of the first ramp for guiding the air spun out of the edge inwardly along the second face of the disk, and a second ramp on the interior of the housing projecting outwardly away from the second face in the area of the tongue, the second ramp and the second disk face defining an enlarging path therebetween for air flowing in a circumferential direction whereby a static pressure differential is established between the air flowing adjacent the opposite faces of the rotating disk which increases the flow of air folding over the disk edge.

5. A system for filtering fluid surrounding a rotating mass, which comprises a housing enclosing the mass and having first and second ports, a scoop having a dish portion projecting into the housing through the first port, the dish having an entrance aperture bounded in part by a peeling edge for peeling off a portion of a boundary layer of fluid flowing as a result of pumping action of the rotating mass and for guiding such fluid away from the boundary and into the scoop, an external conduit connected between the scoop and the second port, and a filter within the conduit for filtering particles from fluid flowing through the conduit.

6. A system according to claim 5, wherein the rotating mass is a rotating disk and wherein the housing has interior contour with a projection extending radially inwardly toward the rotating disk in the area adjacent to the scoop for guiding the flow of fluid into the scoop.

7. A rotatable magnetic disk file self-purging system comprising:

a housing for the disk, the housing including end walls having a first port adjacent to the periphery of the disk and a second port adjacent to a center part of the disk; a conduit connected between the ports for returning to the second port air flowing out of the first port because of the pumping action of the disk; a filter in the conduit for collecting the particles; and means for folding air flowing from one side of the disk opposite the first port over the disk edge for joining air flowing on the other side where it can enter the conduit.

8. The system according to claim 7, wherein the air folding means comprises means on an interior surface of the housing for providing a non-uniform clearance between the faces of the disk and the housing along a circumferential direction.

* * * * *